Feb. 4, 1958 A. H. GOREY 2,821,891
DIAPHRAGM FOR PHOTOGRAPHIC CAMERAS
Original Filed March 3, 1950 3 Sheets-Sheet 1

INVENTOR.
ARCHIE H. GOREY
BY
ATTORNEY

Feb. 4, 1958  A. H. GOREY  2,821,891
DIAPHRAGM FOR PHOTOGRAPHIC CAMERAS
Original Filed March 3, 1950  3 Sheets-Sheet 2

INVENTOR.
ARCHIE H. GOREY
BY
ATTORNEY

Feb. 4, 1958 A. H. GOREY 2,821,891
DIAPHRAGM FOR PHOTOGRAPHIC CAMERAS
Original Filed March 3, 1950 3 Sheets-Sheet 3

INVENTOR.
ARCHIE H. GOREY
BY
ATTORNEY

United States Patent Office 2,821,891
Patented Feb. 4, 1958

2,821,891

DIAPHRAGM FOR PHOTOGRAPHIC CAMERAS

Archie H. Gorey, Irondequoit, N. Y., assignor to Graflex, Inc., Rochester, N. Y., a corporation of Delaware Original application March 3, 1950, Serial No. 147,481, now Patent No. 2,701,992, dated February 15, 1955. Divided and this application December 1, 1954, Serial No. 472,290

1 Claim. (Cl. 95—64)

The present invention relates to shutter mechanism for photographic cameras, and more particularly to a between-the-lens shutter. This application is a division of my pending U. S. patent application Serial No. 147,481, now Patent No. 2,701,992, granted February 15, 1955.

In the known types of camera shutters, the full opening of the diaphragm leaves, required for focusing, disturbs the diaphragm setting; and after focusing the diaphragm has to be readjusted to its desired setting. Furthermore, after focusing, separate operations are required to close the shutter leaves and to close the diaphragm leaves down to their desired setting. All this takes time which is precious in high-speed picture taking; it may lead to error in the diaphragm setting; and because of the required manipulation of the camera after focusing may destroy proper focus.

One object of the present invention is to provide an improved diaphragm for a between-the-lens shutter that is of simple construction and that will require a minimum of space in the shutter casing.

Another object of the invention is to provide such a diaphragm which is capable of being set to a predetermined aperture, and which may be fully opened to permit focusing, and which when closed will return again to said aperture without requiring resetting by the photographer.

Still another object of the invention is to provide a diaphragm which is capable of being set to a predetermined aperture, and which may be fully opened to permit focusing, and which can be adjusted, while open, to a different aperture, and which when closed will close down to its new, adjusted aperture setting.

Other objects of the invention will be apparent hereinafter from the specification and from the recital of the appended claim.

Figure 1:
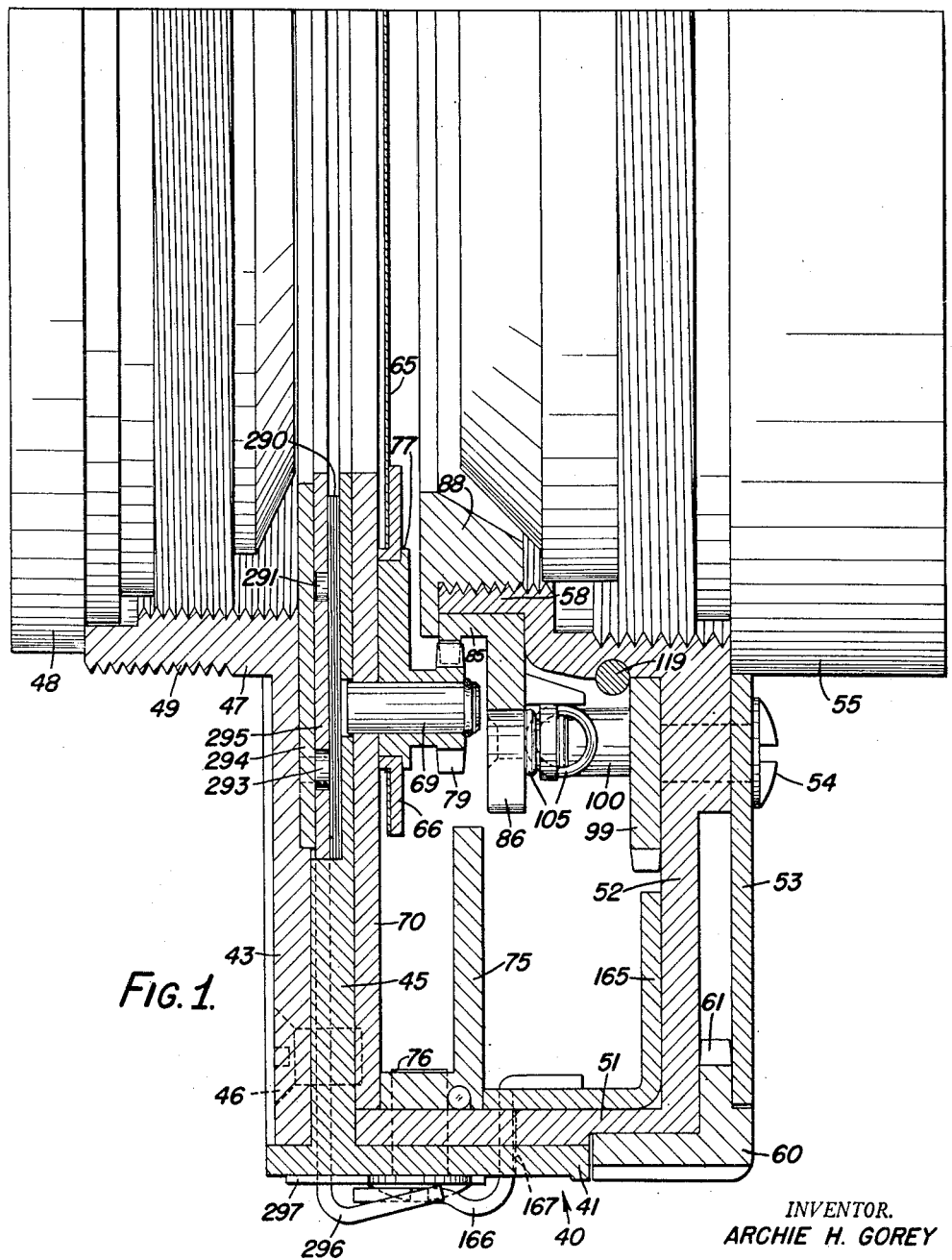
Fig. 1 is a fragmentary axial sectional view through a shutter made according to one embodiment of this invention.

Referring now to the drawings by numerals of reference, 40 denotes the shutter generally. The shutter mechanism is encased within a cylindrical body or housing 41 (Fig. 1) that is formed with an internally projecting, circular flange 45. The casing 43 for the back lens element 48 is formed with a flange portion that seats against the flange 45 of housing 41 and that is secured to flange 45 by screws 46. The lens casing 43 is formed with an axially extending, cylindrical flange 47 that is threaded internally to receive the back lens element 48, and that is threaded externally, as denoted at 49, to thread into the lens board (not shown) of the camera.

Also mounted within the casing 41 is the casing 52 for the front lens element 55 of the mounting. The casing 52 is formed with an axially-extending cylindrical portion 51 which fits tightly within the casing 41 and is secured against relative movement thereto. The casing 52 is also formed with a cylindrical flange portion 58, which is concentric with and lies radially within flange 51 and which is internally threaded to receive the front lens element 55. Secured to the casing member 52 by screws 54 is a front cover plate 53.

Rotatably mounted on the flange portion 51 of the casing 52 is a wind-up ring 60. This ring has a knurled outer peripheral surface; and it has an internal gear 61 integral with it which projects into the space between the cover plate 53 and the parallel portion of lens casing 52.

Figure 2:
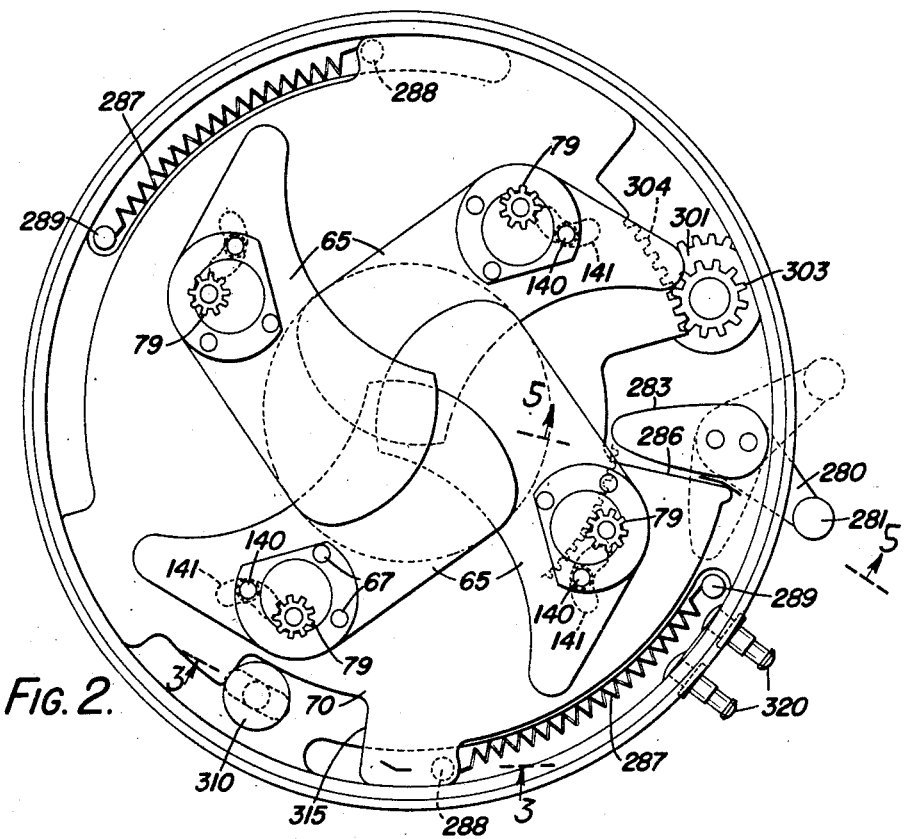
Fig. 2 is a transverse sectional view of the shutter on a smaller scale than Fig. 1, showing the shutter leaves closed and illustrating their mounting and actuating mechanism.
Figure 4:
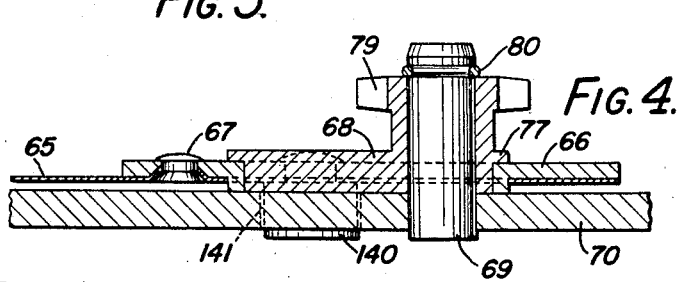
Fig. 4 is a greatly enlarged view showing fragmentarily one of the shutter leaves, its mounting, and its driving mechanism.

In the embodiment of the invention shown there are four shutter leaves 65 (Figs. 1, 2 and 4). These are designed, as shown in Fig. 2, so that they overlap, when in closed position, to prevent passage of light from the forward lens element to the rear lens element and the sensitive medium of the camera. Each shutter leaf 65 is secured to a hub 66 in any suitable manner, as by rivets 67. Each hub fits rotatably on an eccentric member 68 that is journaled on a stud 69 which, in turn, has a pressed fit in a shutter leaf plate 70. The leaf plate 70 is rotatably movable in the casing 52, but is held against axial movement relative to the casing 52 by a mechanism plate 75 that is secured to the casings 41 and 52 by screws 76 (Fig. 1). Each eccentric 68 has a flange 77 for retaining the associated shutter leaf against axial movement, the hub of each shutter leaf being held between the associated flange 77 and the shutter leaf plate 70. Formed integral with each eccentric 68 is a spur pinion 79. A snap ring 80 serves to hold each pinion 79 and its eccentric 68 on its stud 69.

The several pinions 79 mesh with a spur master gear 85 (Fig. 1) which is journaled on the hub portion 58 of the casing 52 and which is integral with a toothed ring 86.

The internal gear 61 drives through spur gearing, as is described in detail in my parent application Serial No. 147,481 above-mentioned, a spur gear 99 (Fig. 1) which is journaled on the hub portion 58 of casing 52. This spur gear 99 has two diametrically opposite studs 100 secured in it. Secured to each stud is one end of a coil spring 105. Each of these coil springs is secured at its opposite end to a stud 106, as is disclosed more fully in my parent application above-mentioned. These two studs 106 are diametrically opposite and are riveted in the portion 86 of master gear 85.

The shutter mechanism of the present invention is designed to be actuated by the springs 105, the springs being wound-up by rotating ring 60 to cock the shutter, and operating, when the shutter mechanism is tripped, to drive the master gear 85 (Fig. 1) and, through the master gear, the pinions 79 (Fig. 4), thus causing the shutter leaves to be opened and then closed, the mechanism operating in this particular like the mechanism of my U. S. Patent No. 2,593,873, granted April 22, 1952.

The cover plate 53 (Fig. 1) holds the winding ring 60 in place. A nut 88, which threads into the lens casing 58, serves to hold the master gear 85 and toothed plate 86 against a shoulder on the lens casing 58.

The master gear 85 is locked against rotation during the winding operation, by means fully described in my parent application above-mentioned. A trigger (not shown) serves to disengage the locking mechanism, as described in my parent application, thereby releasing the master gear 85. The springs 105 then take over and drive the master gear 85, causing the master gear to rotate the pinions 79.

There is a pin 140 secured to each shutter leaf hub 66 (Figs. 2 and 4), and each pin 140 engages in an arcuate slot 141 in the shutter leaf plate 70. As the pinions 79 are rotated by the master gear 85, then, each leaf rotates in an oscillating manner due to the throw of its eccentric 68 and the constraining influence of its pin 140 and the associated slot 141. Hence, as the pinions 79 rotate, the shutter leaves, which are closed when the spring plate 99 is wound, are first opened and then closed again. During the time that the shutter leaves are open the sensitive medium in the camera is exposed. The action of the eccentrics 68, pins 140 and slots 141 in the opening and closing of the shutter leaves is the same as in my prior patent above-mentioned and need not further be described here.

When the camera, on which the present mounting is employed, is equipped with a range finder or a view finder and these devices are used, the shutter need not be opened for focusing. When critical focusing is required on ground glass, however, both the shutter and the diaphragm leaves, hereinafter to be described, are opened.

The shutter mechanism of the present invention is so constructed that it can be opened wide for focusing without disturbing the setting or tripping lever or any other mechanism.

Figure 5:
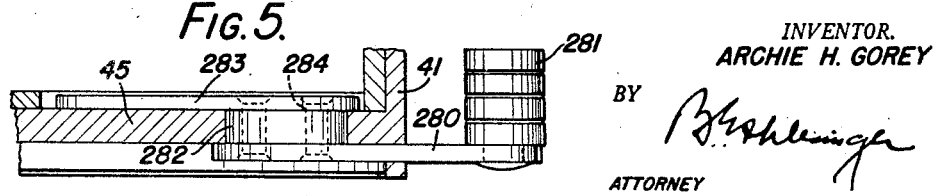
Fig. 5 is a fragmentary sectional view on an enlarged scale taken on the line 5—5 of Fig. 2 and showing the lever for opening the shutter leaves to focusing position.

For opening the shutter for focusing, a lever 280 that is manually operable by means of a handle 281, is provided (Figs. 2 and 5). This lever extends through a slot in the casing 41 and is secured to a bearing 282 which is journaled in the flange portion 45 of the casing. It has an arm 283 secured to it by means of rivets 284. The arm is adapted to bear against the surface 286 (Fig. 2) of the shutter plate 70. When the lever 280 is rocked from the full line position shown in Fig. 5 to the dotted line position, then, the shutter plate 70 is turned in a clockwise direction against the resistance of the two diametrically opposed springs 287. The springs 287 are each connected at one end to a pin 288 secured in the shutter plate and at their opposite ends to a pin 289 secured in the casing 41.

As the shutter plate 70 moves, it carries with it the shutter leaves 65, causing the pinions 79 (Figs. 1 and 4) to roll on the master gear 85, which is shown only fragmentarily in Fig. 2, thereby causing the shutter leaves to open fully to focusing position. The lever only shoves the shutter leaf plate 70 approximately half way of its full movement in the cycle of opening and closing of the shutters. The shutter leaves are locked in focusing position by reason of the fact that the lever 280 has passed over dead center. To close the shutters, the lever is returned to original position.

Figure 6:
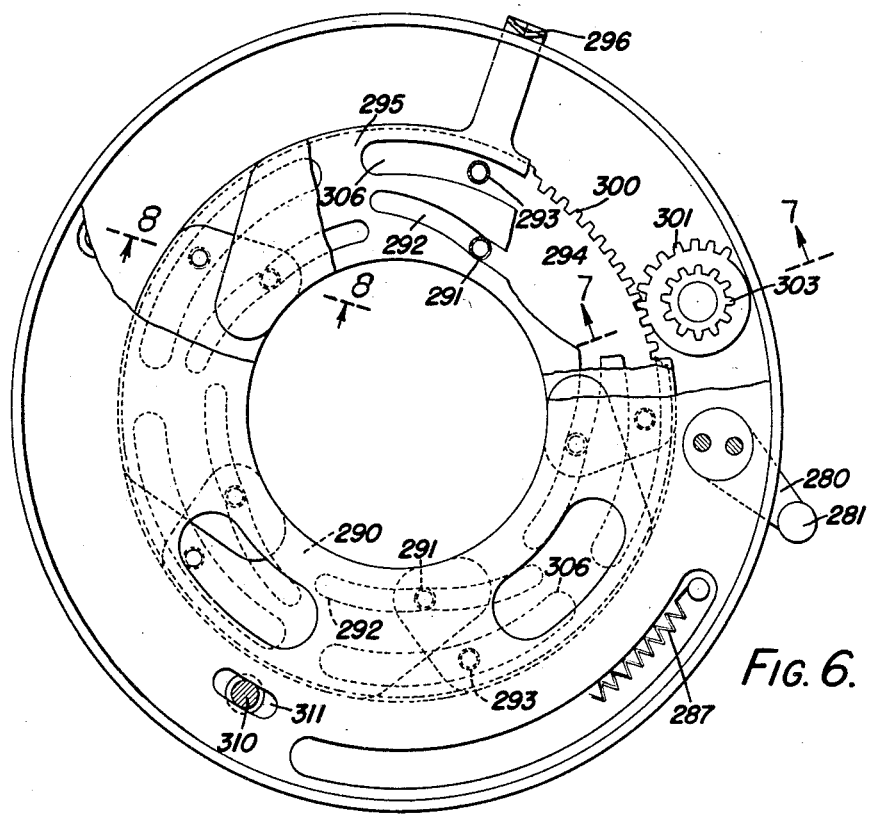
Fig. 6 is a transverse sectional view taken in a transverse plane through the shutter and showing the mounting of the diaphragm leaves and the mechanism for setting the same.
Figure 7:
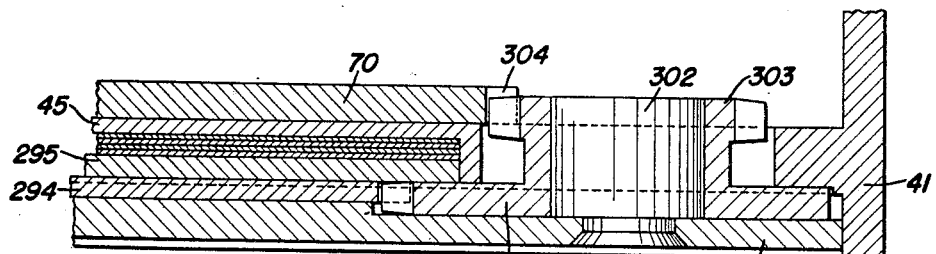
Fig. 7 is a section on the line 7—7 of Fig. 6, looking in the direction of the arrows.
Figure 8:
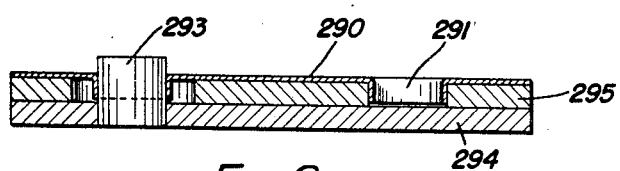
Fig. 8 is a section on the line 8—8 of Fig. 6, looking in the direction of the arrows.

The diaphragm comprises five overlapping leaves 290 (Figs. 1, 6, 7 and 8) which are shown in full open, focusing position in Fig. 6. Each leaf has a pin 291 integral with it which engages in a cam slot 292 of the diaphragm setting ring 295. These cam slots are all alike. Each diaphragm leaf is also pivoted by means of a pin 293 in a plate 294.

The cam plate 295 is rotatably adjustable by movement of the index lever 296 which extends through a slot in the casing 41 and which registers against a graduated plate 297 (Fig. 1) that is secured to the outside of the casing. The plate 294, in which the diaphragm leaves are pivoted, is operatively connected to the shutter leaf plate 70 (Figs. 2 and 7) through a gear 300 which is provided on the periphery of the plate 294, the pinion 301 which meshes therewith (Figs. 6 and 7) and which is rotatable on a stud 302, the pinion 303 which is integral with pinion 301, and the gear segment 304 which is integral with the shutter leaf plate 70. Hence, as the shutter leaf plate 70 is moved by the lever 280 to open the shutter leaves to focusing position, the diaphragm pivot plate 294 is also rotated, dragging the diaphragm leaf pivots 293 in a clockwise direction, as viewed in Fig. 6. This opens the diaphragm leaves wide to focusing position simultaneously with the opening of the shutter leaves to focusing position. Elongated arcuate slots 306 are provided in the diaphragm leaf plate 295 to permit the movement of the pivots 293 in this adjustment.

Figure 3:
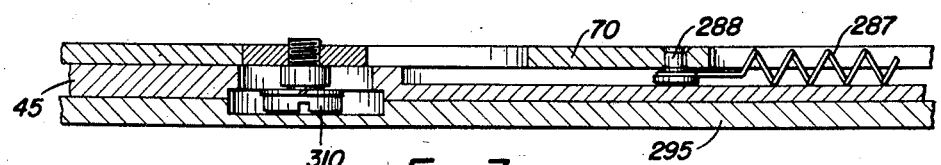
Fig. 3 is an enlarged fragmentary sectional view taken substantially on the line 3—3 of Fig. 2.

The shutter leaf plate 70 and the cam plate 294 are held in open position, after the lever 280 has passed dead center, by the springs 287 (Fig. 2). The shutter leaf plate returns to closed position against a stop 310 (Figs. 2 and 3) which is secured in the flange 45 of casing 41 and which is adapted to abut against a surface 311 on shutter leaf plate 70.

To prevent tripping of the shutter when the shutter and diaphragm leaves are open for focusing, a cam surface 315 (Fig. 2) is provided on the shutter leaf plate 70. This surface is moved up against a pin on the trigger lever when the shutter leaf plate is moved to focusing position, as is disclosed more fully in my parent application above-mentioned. This prevents the trigger from being tripped as long as the shutter and diaphragm leaves are in focusing position.

A further feature of the present invention is that the diaphragm leaves close down to their setting, that is, to their previously adjusted position, when the lever 280 is swung back to close the shutter after focusing. When the index pointer 296 is moved to adjust the diaphragm, the followers 291 are adjusted along the cam slots 292 and the pins 293 are the pivots for movement of the leaves. In focusing, the pins 293 are moved with plate 294 and the pins 291 are moved back in cam slots 292 to the wide open position, the cam plate 295 remaining stationary. Therefore index pointer 296 and plate 295 are not disturbed during focusing; and upon closing of the shutter, after focusing, then, the diaphragm leaves return to their adjusted positions.

Another feature of this construction is that the setting of the diaphragm leaves may be changed during focusing. In this case, the diaphragm leaves will return to the new setting after focusing.

Heretofore, after focusing, it has been necessary to readjust the diaphragm to the desired opening. My mechanism eliminates the necessity for any such readjustment. The automatic opening of the diaphragm upon opening of the shutter leaves to focusing position is a further time-saving feature. These are very important considerations in picture-taking. Moreover, with my mechanism a single lever opens the shutter and diaphragm leaves to focusing position, and closes the shutter leaves and shuts the diaphragm down to its setting again after focusing.

While the invention has been described in connection with a particular embodiment thereof, it is capable of further modification and this application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claim.

Having thus described my invention what I claim is:

In a shutter for photographic cameras, a rotary member, a plurality of diaphragm leaves, means pivotally mounting each leaf on said rotary member, a cam ring rotatably adjustable about an axis common with the axis of said rotary member, said cam ring having a plurality of identical, spaced, arcuate slots therein coaxial with said common axis and equal in number to the number of said diaphragm leaves and through which said pivotal means pass, said cam ring having a plurality of identical cam slots therein extending about said common axis and which are equal in number to said diaphragm leaves and which are angularly spaced about said common axis, each of said diaphragm leaves having a follower secured thereto offset from its pivotal means and engaging in one of said cam slots, the pivotal means and the follower of each diaphragm leaf being disposed at the same side of said common axis, a manually movable index member connected to said cam ring to rotate said cam ring about said common axis to adjust said diaphragm leaves to a selected position in accordance with a selected aperture size, a pivoted lever, a gear secured to said rotary member, means including a gear meshing with the first-named gear for connecting said lever to said rotary member to swing all said diaphragm leaves simultaneously open to focusing position upon pivotal movement of said lever in one direction, and spring means for constantly urging said rotary member in the opposite direction to constantly urge said diaphragm leaves to said selected position.

References Cited in the file of this patent

UNITED STATES PATENTS

| | | |
|---|---|---|
| 21,470 | Harrison et al. | Sept. 7, 1858 |
| 2,340,573 | Aiken | Feb. 1, 1944 |
| 2,354,168 | Aiken | July 18, 1944 |
| 2,580,324 | Schwartz | Dec. 25, 1951 |